United States Patent [19]
Besse et al.

[11] Patent Number: 6,056,838
[45] Date of Patent: May 2, 2000

[54] METHOD FOR MANUFACTURING A VARIABLE-PITCH COMPOSITE BLADE FOR A HELICOPTER ROTOR

[75] Inventors: Jean-Luc Besse, Saint-Ouen; Jacques Gaffiero, Paris, both of France

[73] Assignee: Eurocopter, Marignane Cedex, France

[21] Appl. No.: 09/207,352

[22] Filed: Dec. 8, 1998

Related U.S. Application Data

[63] Continuation of application No. 08/741,169, Oct. 29, 1996, abandoned.

[30] Foreign Application Priority Data

Oct. 30, 1995 [FR] France .................................. 95 12777

[51] Int. Cl.[7] .................................................. B64C 27/473
[52] U.S. Cl. ........................... 156/75; 156/245; 264/258; 264/279; 264/328.2; 416/230; 416/239
[58] Field of Search ..................................... 156/245, 213, 156/214, 228, 75; 264/257, 258, 271.1, 294, 279, 328.2, 328.4; 416/230 R, 234, 239, 241 A, 230 A, 248, 226

[56] References Cited

U.S. PATENT DOCUMENTS

| | | |
|---|---|---|
| 3,000,446 | 9/1961 | Warnken . |
| 3,021,246 | 2/1962 | Hutter et al. . |
| 3,321,019 | 5/1967 | Dmitroff et al. ..................... 416/230 A |
| 3,484,174 | 12/1969 | McCoubrey . |
| 4,213,739 | 7/1980 | Euler et al. . |
| 4,268,571 | 5/1981 | McCarthy . |
| 4,298,417 | 11/1981 | Euler et al. . |
| 4,478,915 | 10/1984 | Poss et al. . |
| 4,626,172 | 12/1986 | Mouille et al. . |
| 4,639,284 | 1/1987 | Mouille et al. .......................... 156/245 |
| 4,648,921 | 3/1987 | Nutter, Jr. ............................... 416/230 |
| 4,680,213 | 7/1987 | Fourezon . |
| 4,696,623 | 9/1987 | Bost . |
| 4,892,462 | 1/1990 | Barbier et al. . |
| 4,966,527 | 10/1990 | Merz . |
| 4,990,205 | 2/1991 | Barbier et al. . |
| 5,213,476 | 5/1993 | Monroe .................................. 416/230 |
| 5,346,367 | 9/1994 | Doolin et al. . |
| 5,439,353 | 8/1995 | Cook et al. ............................. 416/230 |
| 5,454,693 | 10/1995 | Aubry et al. ............................ 264/257 |

FOREIGN PATENT DOCUMENTS

| | | |
|---|---|---|
| 0 187 590 | 7/1986 | European Pat. Off. . |
| 0 198 776 | 10/1986 | European Pat. Off. . |
| 0 296 014 | 12/1988 | European Pat. Off. . |
| 2 252 916 | 6/1975 | France . |
| 2 381 662 | 9/1978 | France . |
| 2 683 764 | 5/1993 | France . |
| 1 125 513 | 8/1968 | United Kingdom . |
| 1 484 179 | 9/1977 | United Kingdom . |
| 2 026 416 | 2/1980 | United Kingdom . |
| WO83/00118 | 1/1983 | WIPO . |

*Primary Examiner*—Geoffrey L. Knable
*Attorney, Agent, or Firm*—Henderson & Sturm LLP

[57] ABSTRACT

The method comprises the following steps: producing a preform of the blade comprising a blade root section for connection to a hub and an aerodynamically profiled main blade section, the blade root section of the preform including at least one cylindrical portion for guidance in terms of incidence; arranging a respective peripheral metal ring around each cylindrical portion for guidance in terms of incidence of the preform; arranging the preform provided with each peripheral metal ring in an injection mould; injecting a thermosetting liquid resin into the mould; and heating the mould to make the thermosetting resin set.

13 Claims, 6 Drawing Sheets

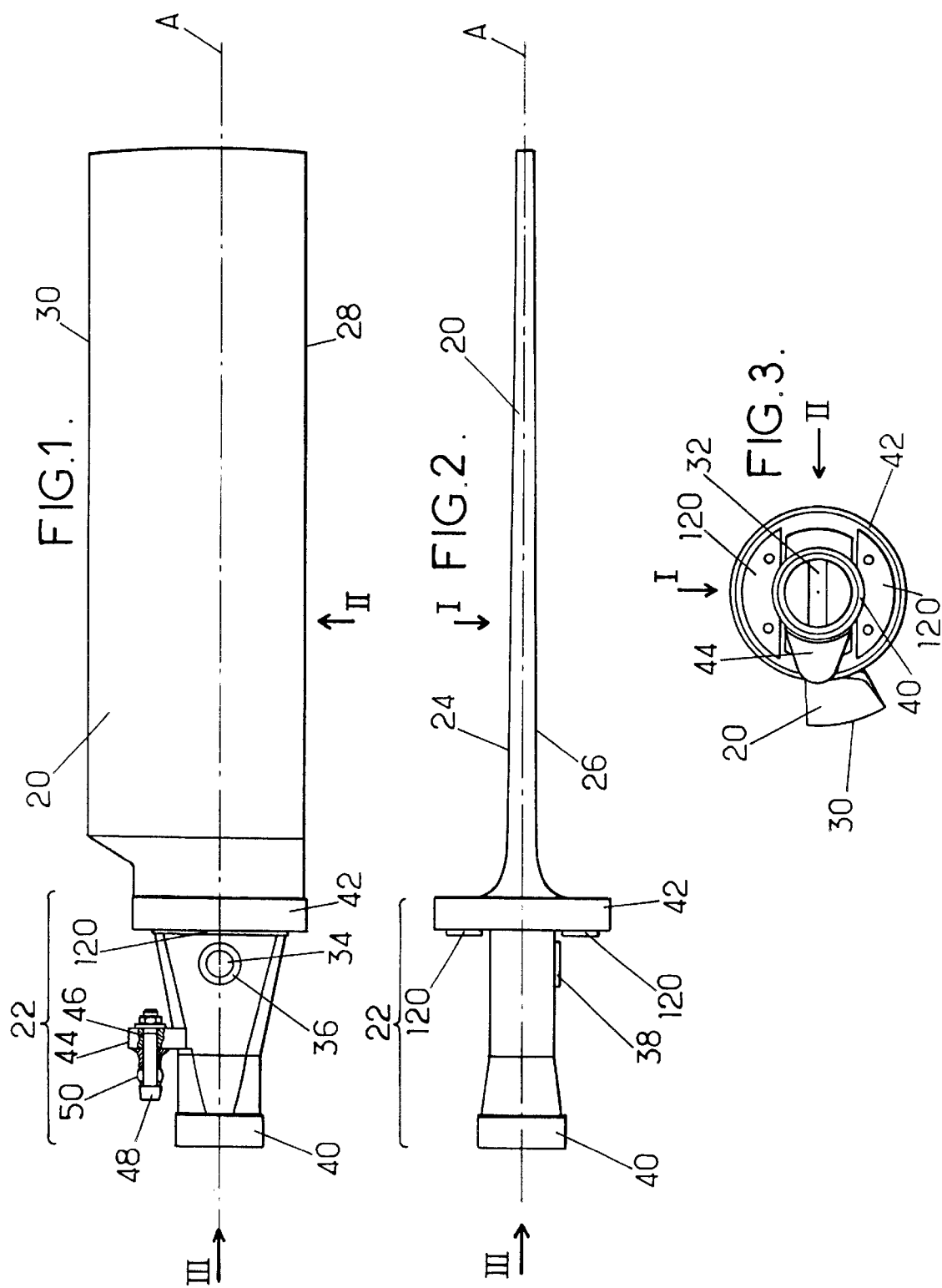

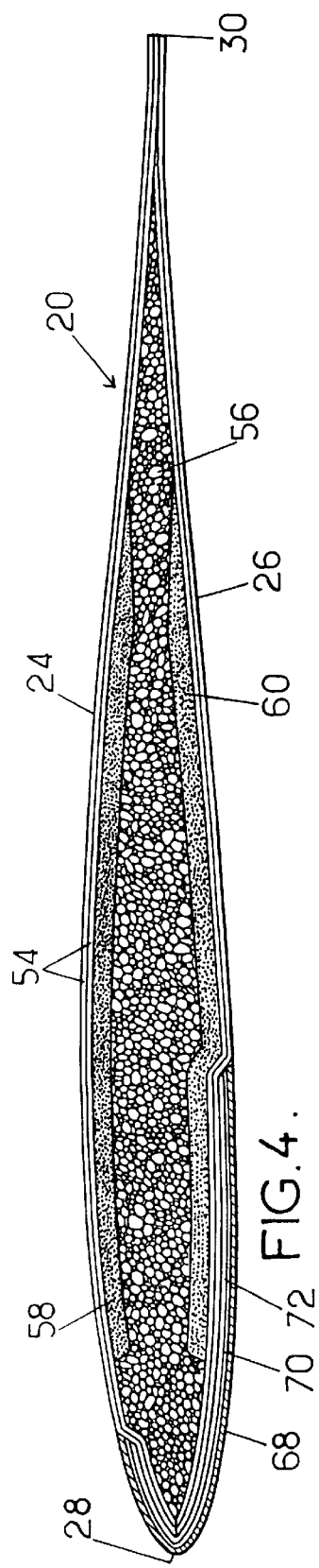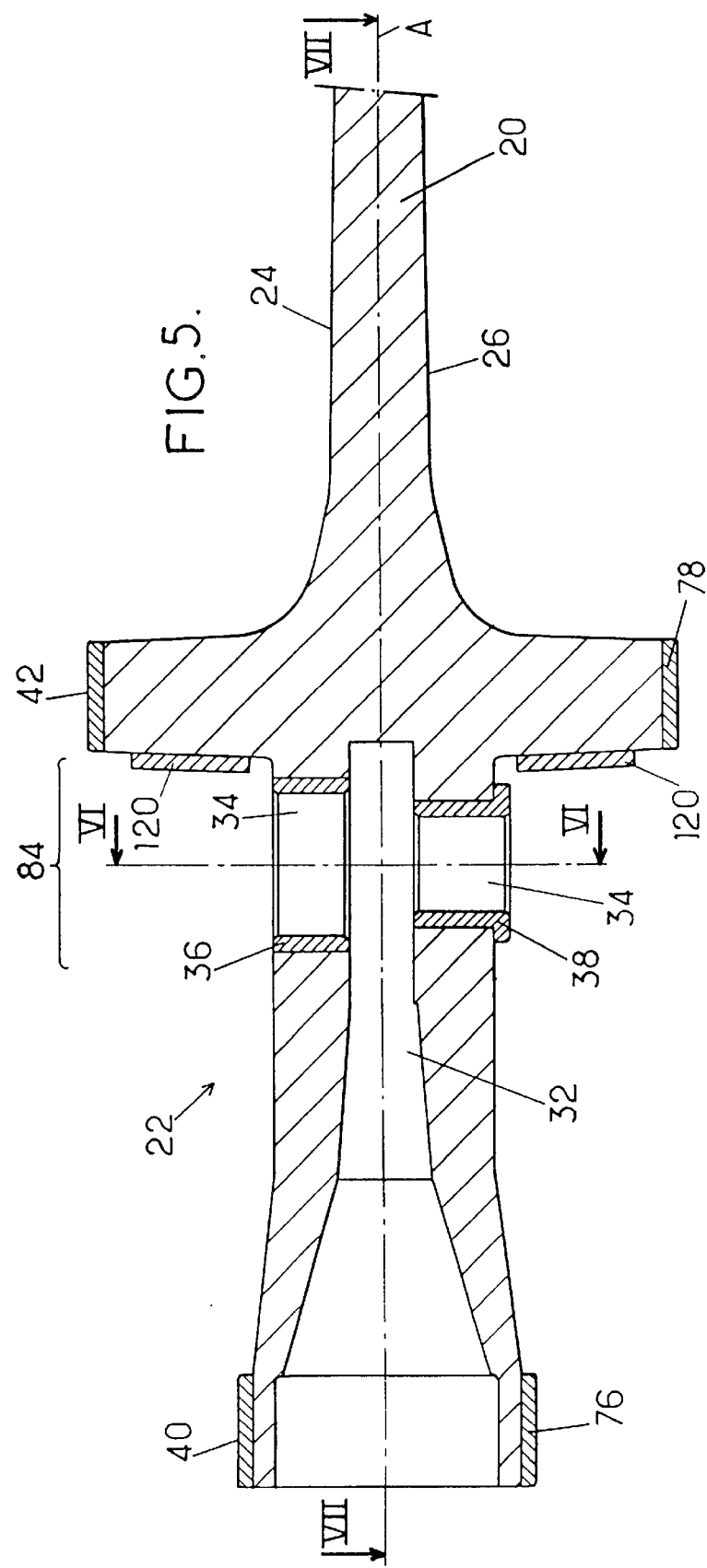

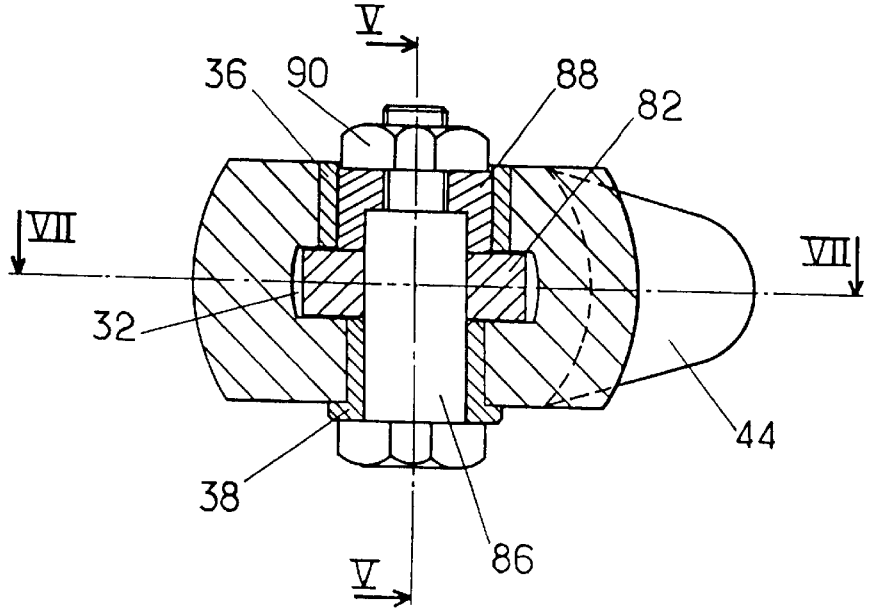
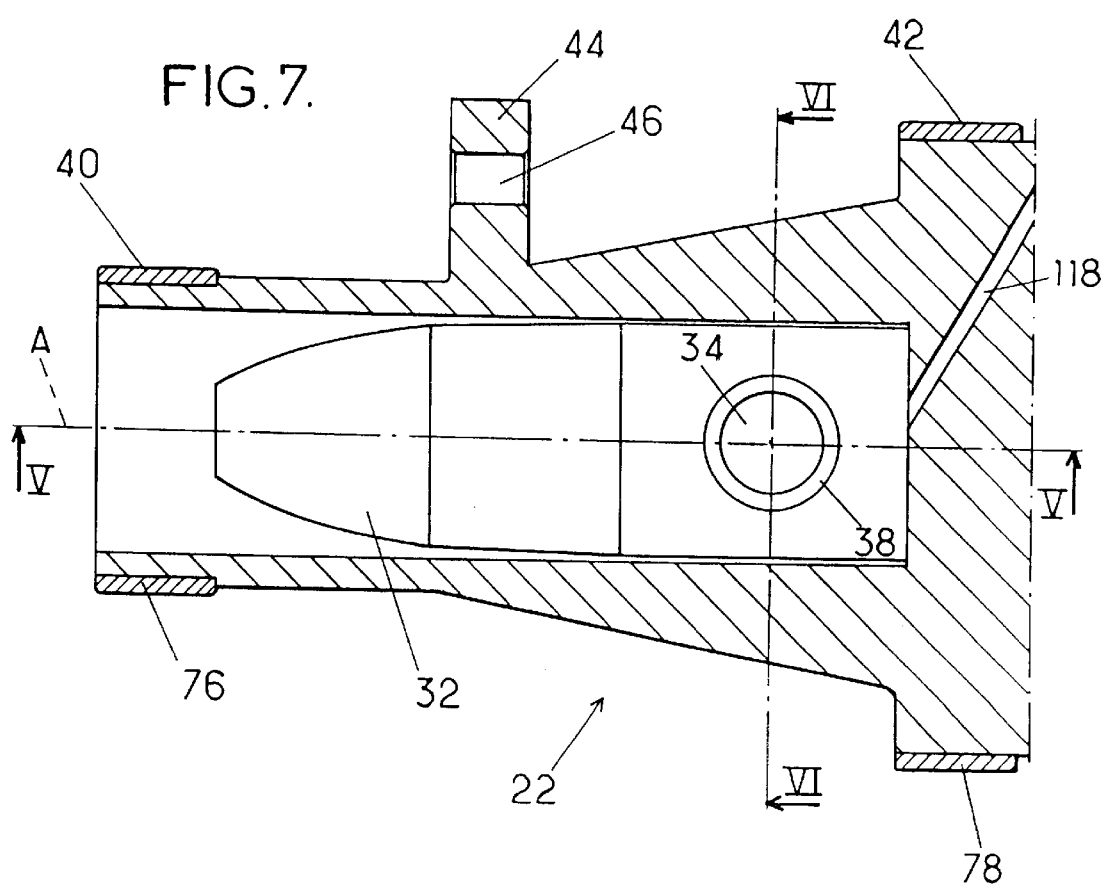

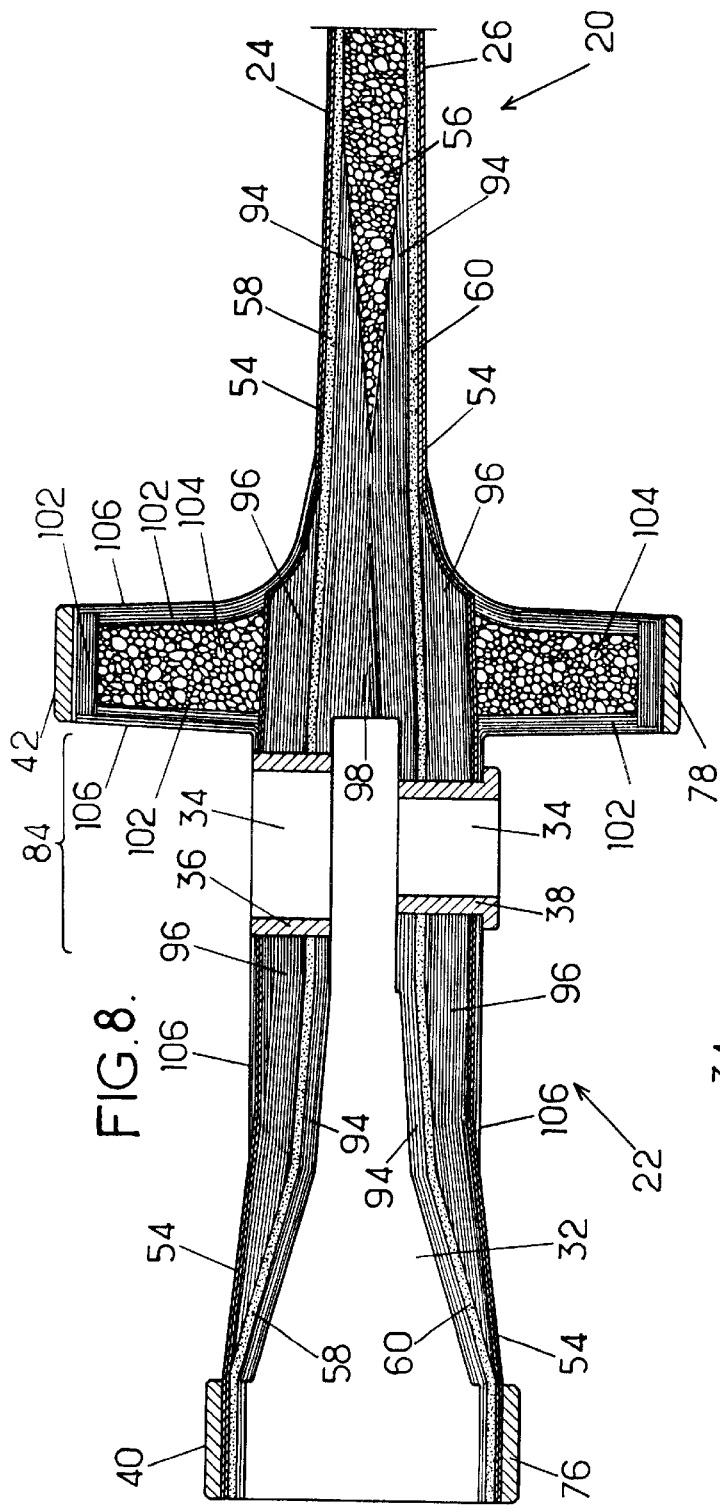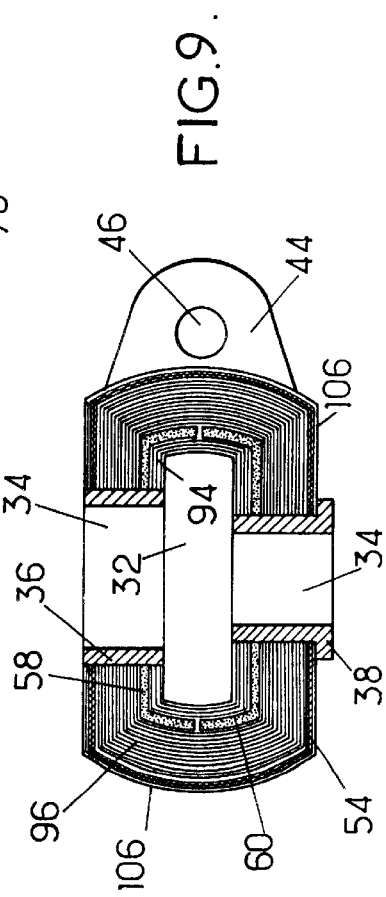

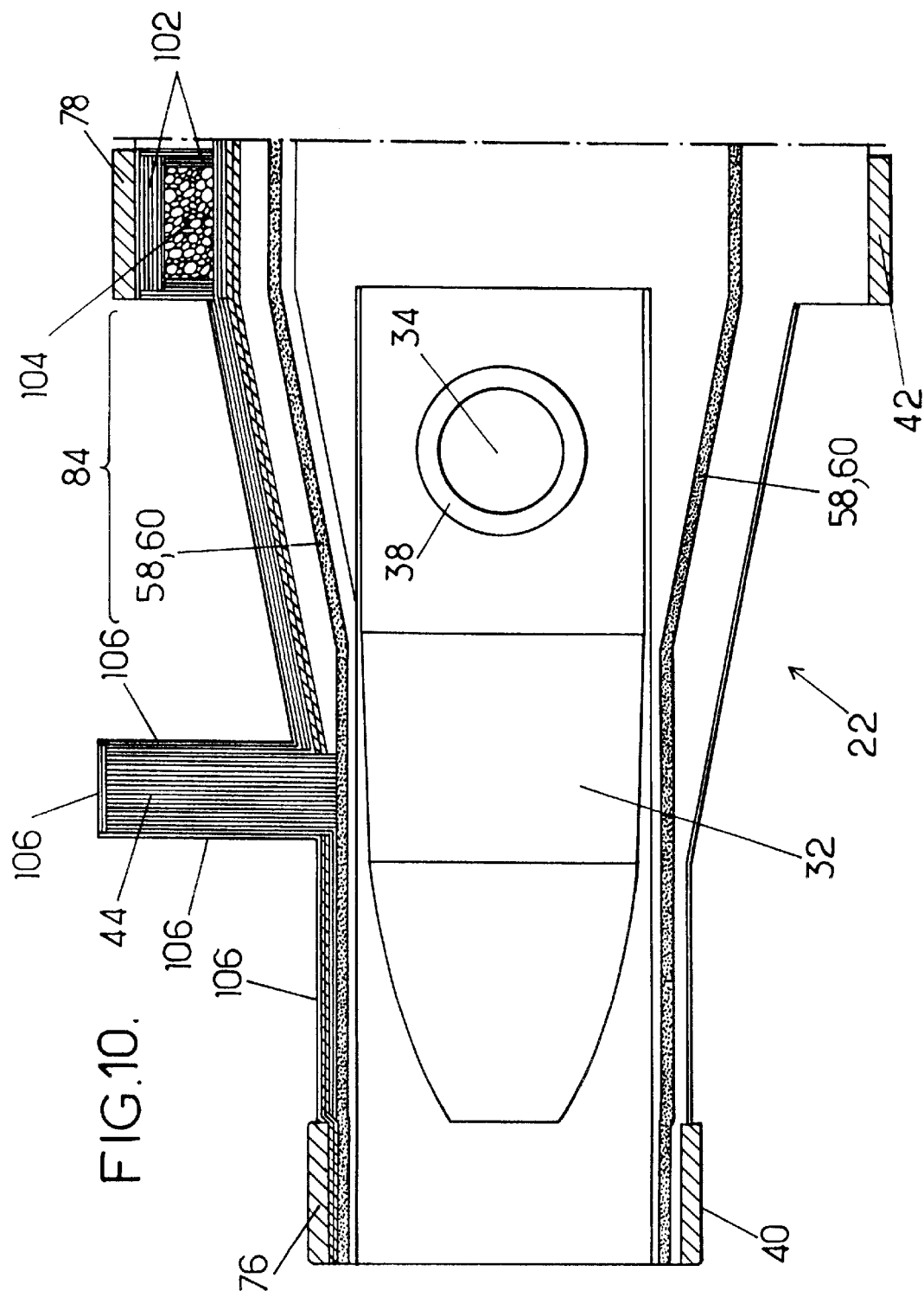

METHOD FOR MANUFACTURING A VARIABLE-PITCH COMPOSITE BLADE FOR A HELICOPTER ROTOR

RELATED APPLICATION

This continuation application is a continuation of Ser. No. 08/741,169 filed Oct. 29, 1996 entitled Method for Manufacturing a Variable-Pitch Composite Blade for a Helicopter Rotor, now abandoned, the disclosure of which in its entirely is incorporated by reference thereto herein.

BACKGROUND OF THE INVENTION

The present invention relates to a method for manufacturing a blade made of composite material for a helicopter rotor. The invention applies especially, although not exclusively, to variable-pitch blades intended to equip helicopter tail rotors.

Composite materials offer an attractive solution to the problem of producing helicopter blades with low mass. The technique most commonly employed relies on the use of fabrics which are preimpregnated with a thermosetting resin. This allows various constituent elements of the blade to be assembled and the assembly to be secured together by heating in a mould under pressure (see FR-A-2,616,409 for example or the corresponding U.S. Pat. Nos. 4,892,462 and 4,990,205). This technique provides satisfactory blades, but with a relatively high manufacturing cost, due mainly to the difficulty in mass-producing reliable quality blades, and to the fact that various elements still have to be added to the blade once it is removed from the mould.

An object of the present invention is to propose a method for manufacturing a blade made of composite material making it possible to obtain a quality blade in a reliable and economical manner.

The invention thus proposes a method for manufacturing a variable-pitch composite blade for a helicopter rotor, comprising the following steps:

producing a preform of the blade comprising a blade root section for connection to a hub and an aerodynamically profiled main blade section, the blade root section of the preform including at least one cylindrical portion for guidance in terms of incidence;

arranging a respective peripheral metal ring around each cylindrical portion for guidance in terms of incidence of the preform;

arranging the preform provided with each peripheral metal ring in an injection mould;

injecting a thermosetting liquid resin into the mould; and heating the mould to make the thermosetting resin set.

This resin transfer moulding technique (RTM) makes it possible to produce a quality blade for a modest cost. In particular, the blade has an excellent surface finish when it leaves the mould, so that very little finishing work is necessary before painting it.

In addition, the blade may already incorporate a certain number of functions when it leaves the mould, especially the function of guidance in terms of incidence by means of the metal rings.

An electrical-insulation tape made of glass fibres and a film of adhesive may be arranged between the preform and the peripheral ring for guidance in terms of incidence. As the resin is injected under a certain pressure, it provides a pressure for bonding the composite material and the ring together. In addition, upon cooling, the metal of the ring has greater thermal shrinkage than the composite material of the preform, so that the ring can be fastened to the composite very robustly. In conventional pressure-moulding methods, it is not generally possible to bond the incidence-guidance rings in this way at the time of moulding, because either the pressure is not applied to the rings, which poses local problems of the integrity of the composite and/or the good bonding of the rings, or the pressure is applied to the rings and tends to deform them.

In the step of injecting the thermosetting resin, the resin is preferably injected into a lower part of the mould, and a partial vacuum is created in an upper part of the mould in order to cause the resin to migrate in the direction of the span axis of the blade. The mould may especially be arranged vertically. This procedure minimizes the risks of air bubbles being present in the blade. Furthermore, since the injection mould is not subjected to substantial positive pressure forces, the constituent elements of the blade do not tend to move around or to deform during injection.

In a preferred embodiment of the method, the preform is produced from dusted fabrics, that is to say ones in which the fibres are not preimpregnated with resin, even though resin (which may be a different one from the resin injected subsequently) is present in the form of powder in the fabric. Such fabrics can be preassembled by moderate heating (of the order of 100° C.) in order to produce a lower shell and an upper shell which are then put together in a heated conforming mould in order to obtain the preform.

The preform may especially include one or more spars, each consisting of a unidirectional tape of carbon fibres, that is to say one which is composed mainly of longitudinal structural carbon fibres, and of a substantially smaller proportion of glass fibres woven transversely between the carbon fibres. These glass fibres give the spar mechanical strength for handling it for producing the preform, and also serve to form gaps between the longitudinal carbon fibres allowing the resin to flow during the injection phase.

As a preference, the preform includes, in the blade root section, a pile of fabrics transverse to the span axis of the blade and projecting with respect to the blade root section, so as to constitute, after injection, a pitch-control lever. The pitch-control lever may thus be incorporated right from the time of moulding. Its positioning is accurate and reproducible because it is determined by the shape of the injection mould, this eliminating the dimensioning and positioning problems usually encountered when the pitch-control lever is added on after the blade leaves the mould.

BRIEF DESCRIPTION OF THE DRAWINGS

FIGS. 1 to 3 are elevations of a blade produced according to the invention, in the directions I, II and III respectively.

FIG. 4 shows a cross-section through the main blade section of the blade of FIGS. 1 to 3.

FIGS. 5 to 7 show sections of the blade root section of the blade of FIGS. 1 to 3, on planes V, VI and VII respectively.

FIGS. 8 to 10 are views respectively analogous with FIGS. 5 to 7 showing in greater detail the arrangement of the layers of fabric in the composite material of the blade;

DESCRIPTION OF A PREFERRED EMBODIMENT

Figure 11:
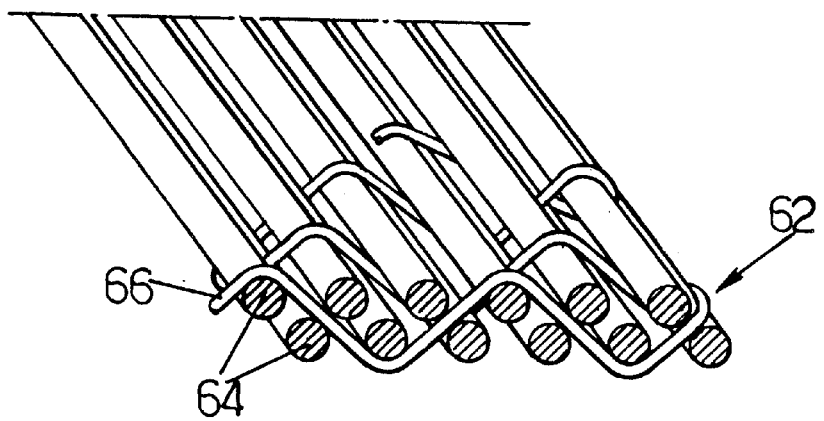
FIG. 11 is a diagram in perspective of a unidirectional tape for the production of spars in a blade according to the invention.

FIGS. 1 to 3 show the external appearance of an example of a blade for a helicopter tail rotor produced in accordance with the present invention. This blade is composed of an aerodynamically profiled main blade section 20 and of a blade root section 22. The aerodynamic profile of the main blade section 20 has an upper face, or suction face, 24 and a lower face, or pressure face, 26 which meet along a leading edge 28 and a trailing edge 30. This aerodynamic profile generally has some twist (not represented in FIGS. 1 and 2 but visible in FIG. 3) about the span axis A of the blade.

The blade root section 22 has the overall form of a sleeve which is open at its end remote from the main blade section 20 so as to take a bar (not represented) for connection to a hub. This sleeve has an internal cavity 32 running along the span axis A of the blade. At the bottom of this cavity, the sleeve has a cylindrical opening 34 at right angles to the span axis A and lined with two metal bushing 36, 38 designed for fastening the blade, using pins, to the bar for connection to the hub passing through it. On the outside, the sleeve of the blade root section 22 has two cylindrical portions 40, 42 centred on the span axis A of the blade, and a portion projecting at right angles to the span axis A forming a pitch-control lever 44. This external form of the blade root section 22 is provided because the example of blade represented is a variable-pitch blade. The bar for connection to the hub to which bar the blade is fastened runs substantially along its span axis A and has a certain freedom in torsion about this axis A. The cylindrical portions 40, 42 which are each lined with a peripheral metal ring are intended to be installed in corresponding bearings securely attached to the hub. A bore 46 (FIG. 1) is pierced in the pitch-control lever 44 for the fastening of a pin 48 substantially parallel to the span axis A and equipped with a spherical portion 50. This spherical portion 50 is intended for a ball-joint connection with a pitch-control rod (not represented). Actuating this rod transversely to the axis A and to the lever 44 allows the incidence of the blade to be adjusted.

The construction of the main blade section 20 is illustrated in FIG. 4. The main blade section 20 comprises an outer skin 54, a central filler body 56, an upper spar 58 and a lower spar 60. In addition to its function of forming an outer skin giving the aerodynamic profile stability, the skin 54 has a function of playing a part in absorbing the dynamic and aerodynamic loadings, especially torsional loadings. As represented in FIG. 4, the skin 54 may consist of two layers of laid-up fabric, one oriented at approximately +45° and the other at approximately −45° with respect to the span axis A of the blade. Each layer of fabric of the skin 54 is 0.3 mm thick for example.

Thanks to the very low injection pressure used in the application of the RTM method according to the invention, the material of the filler body 56 may be a low density foam, that is to say one with a density lower than 100 kg/m$^3$ (typical density values are between 50 and 70 kg/m$^3$). Imide-polymethacrylate foams are suitable for this application. It will be observed that some models of blades produced according to the invention, especially blades with a short chord, may have no filler body 56 made of lightweight foam or the like in their main blade section. Filling may thus consist of a pile of carbon fabrics. In some cases filling may even be omitted, the spars 58, 60 then being contiguous.

The upper spar 58 is situated between the skin 54 and the filler body 56 on the suction face 24 side of the blade. The lower spar 60 is situated between the skin 54 and the filler body 56 on the pressure face 26 side of the blade. Each spar 58, 60 consists of a web of carbon fibres running longitudinally along the span A of the blade. These fibre webs may be produced from continuous unidirectional tapes like the one illustrated diagrammatically in FIG. 11. Such a tape 62 is composed mainly of longitudinal structural carbon fibres grouped together in bundles 64 and of a substantially smaller portion of glass fibres 66 braided transversely between the carbon fibre bundles 64. The proportion of longitudinal carbon fibres is at least 20 times greater than the proportion of glass fibres 66 in the weft direction, hence the designation "unidirectional tape". In order to produce the spars 58, 60, use is made, for example, of such a unidirectional tape having a width (along the chord of the main blade section) of approximately 50 mm, a thickness of approximately 1.2 mm, and a ratio of 98.2% between the density of longitudinal carbon fibres and the density of transverse glass fibres, and a mass per unit area of 1200 g/m$^2$. In the main blade section 20, the main function of the spars 58, 60 is to take up the centrifugal loadings to which the blade is subjected in service. The symmetry of the spars 58, 60 on each side of the span axis A gives good distribution of the loadings in the main blade section.

As represented in FIG. 4, the main blade section 20 includes a sheath 68 for protecting the leading edge 28, having, for example, a greater width on the lower face side than on the upper face side. The sheath 68 may be made of titanium or stainless-steel sheet, drawn by plastic deformation and shaped between a punch and a die. A film of adhesive 70 is applied to the internal face of the sheath 68 in order to fasten it more securely, a layer of fabric 72 (carbon, glass or some other fabric) is interposed between the sheath 68 and the outer skin 54 to make it easier to put the sheath 68 in place and to close the outer skin 54 at the leading edge 28.

The end of the main blade section 20 remote from the blade root is closed by a sealing barrier for preventing moisture from reaching the filler body 56 made of foam. This barrier consists, for example, of a pile of carbon fibre fabrics rolled up on itself about a direction perpendicular to the axis A and precompacted to obtain a profile which is housed in the space delimited by the outer skin 54 and the spars 58, 60 at the end of the main blade section.

The fibres of the composite material of the main blade section 20 are stiffened by the binding thermosetting resin injected during the method detailed hereafter. This composite material also runs into the blade root section 22, as shown by the sectional views of FIGS. 5 to 7. In FIGS. 5 to 7, the broadly-spaced crosshatching represents the composite material while the closely-spaced crosshatching represents the metal elements of the blade root section, essentially the bushings 36, 38 and the rings 76, 78 for guidance in terms of incidence in the cylindrical portions 40, 42. FIGS. 5 to 7 also reveal the cavity 32 provided in the blade root section 22 for taking the bar for connection to the hub. This connection bar 82 is represented in the section of FIG. 6. Since this bar 82 has a flattened rectangle-shaped section, the cavity 32 has a slightly larger complementary cross-section in a region 84 for fastening the part forming the blade root 22. The cavity 32 widens from the fastening region 84 towards the opposite end of the blade to the main blade section 20, so as to allow the connection bar 82 to twist about the axis A (FIG. 5). In the fastening region 84, the composite material of the blade root section 22 forms, towards the upper face 24 side and towards the lower face 26 side, two branches of a clevis block in which the end of the connection bar 82 is inserted. A pin 86 (FIG. 6) can then be engaged through the opening 34 reinforced by the bushings 36, 38 so as to fasten the blade to the connection bar 82. In the embodiment illustrated, the bushing 36 is a plain cylindrical bushing, and the bushing 38 is a cylindrical bushing with a smaller diameter provided with an external shoulder. A stepped washer 88 is engaged in the plain bushing 36, and a nut 90 is screwed onto the pin 86 to block the connection between the blade and the connection bar 82.

FIGS. 8 to 10 show in greater detail the structure of the composite material in the blade root section 22. It may be seen especially that the spars 58, 60 as well as the outer skin 54 extend into the blade root section 22. In the example represented, the spars 58, 60 and the skin 54 extend as far as the end of the blade root section. The spars 58, 60 pass especially into the fastening region 84 where the openings 34 pass through them. In this way the spars, which take up the centrifugal loadings in the blade, transmit these centrifugal loadings to the bar for connection to the hub.

In and around the fastening region 84, attachment reinforcements 94, 96 are situated against the spars 58, 60. Some of these reinforcements 94 are situated between the spar 58, 60 and the wall of the cavity 32. Reinforcements 96 are also provided between the spar 58, 60 and the outer skin 54. In the fastening region 84, the reinforcements 94, 96 have the openings 34 passing through them, as do the spars 58, 60 and the skin 54. The attachment reinforcements 94, 96 consist of piles of carbon fibre fabrics stiffened by the binding resin. As a preference, the fabrics piled up in the attachment reinforcements are oriented alternately at approximately 45° and at approximately 90° with respect to the span axis A of the blade. As FIG. 8 shows, the attachment reinforcements 94, 96 run as far as the main blade section 20, and beyond the fastening region 84 into the blade root section. Towards the main blade section 20, the attachment reinforcements 94, 96 have decreasing thickness so as to transmit loadings uniformly.

Inter-clevis filling fabrics 98 are placed between the internal reinforcements 94 between the end of the cavity 32 and the main blade section 20. These fabrics 98 form a pile which decreases in thickness towards the main blade section 20.

The blade root section 22 includes the two cylindrical portions 40, 42 on each side of the fastening region 84. The larger-diameter cylindrical portion 42 situated between the fastening region 84 and the main blade section 20 consists of piles of carbon-fibre fabrics 102 laid up around two filler bodies 104 made of lightweight material of semicylindrical overall shape (FIGS. 8 and 10). The lightweight material of the filler bodies 104 may be the same as that of the central filler body 56 of the main blade section 20. The smaller-diameter cylindrical portion 40 may be produced more simply by fixing the metal ring 76 directly to the outer skin 54. In order to fasten the metal rings 40, 42, which are made of aluminium for example, a film of adhesive is applied to their internal faces, and a tape of glass fibres is interposed between the ring and the composite material for electrical insulation purposes. Similarly, the bushings 36, 38 are fixed to the composite material by applying a film of adhesive and a tape of glass fibres to their external faces.

FIG. 10 shows that the pitch-control lever 44 consists of a pile of carbon fibre fabrics stiffened and secured to the blade by the binding resin. The fabrics in this pile run in a plane perpendicular to the span axis A of the blade. Linking fabrics 106 cover the surface of the composite material in most of the blade root section 22, especially the exterior surface of the sleeve, the flanks of the larger-diameter incidence-guidance cylindrical portion, the flanks and the periphery of the pitch-control lever 44. These linking fabrics 106 also receive the binding resin for adhering to the blade. They serve mainly to provide continuity in the uptake of loadings between the lower side and upper side in order to prevent these loadings from being transmitted solely by the resin in the blade root section.

To produce a blade of the type described here-inabove, the first step consists in producing a lower shell and an upper shell. The lower shell and the upper shell each comprise a spar 58, 60, the attachment reinforcements 94, 96 situated against this spar, and the corresponding portion of the outer skin 54. Each shell may in addition incorporate a filler body 104 made of foam and reinforcing fabrics 102 (FIG. 8) forming a larger-diameter semicylindrical portion intended to form part of the portion 42 for guidance in terms of incidence. The fabrics from which the shells are produced are dusted fabrics, that is to say fabrics consisting of carbon fibres in which a certain amount of resin is dispersed in the form of a powder. The fabrics of the skin, of the reinforcements and of the spars may be precompacted flat then laid up in two halves of a shaping mould so as to incorporate the forms of the blade, a supply of heat making it possible to soften the resin in order to assemble the fabrics progressively as they are laid up. The halves of the shaping mould and the shells are then closed around a mandrel which has the property of providing pressure on the preform as the temperature rises, for example one made of silicone which expands as the temperature increases. By heating the shaping mould, the lower shell and the upper shell are compacted, so that they can then easily be transported to a conforming mould.

The preform (lower and upper shells) may, alternatively, be produced by a technique of braiding rather than the laying-up technique explained hereinabove.

Figure 12:
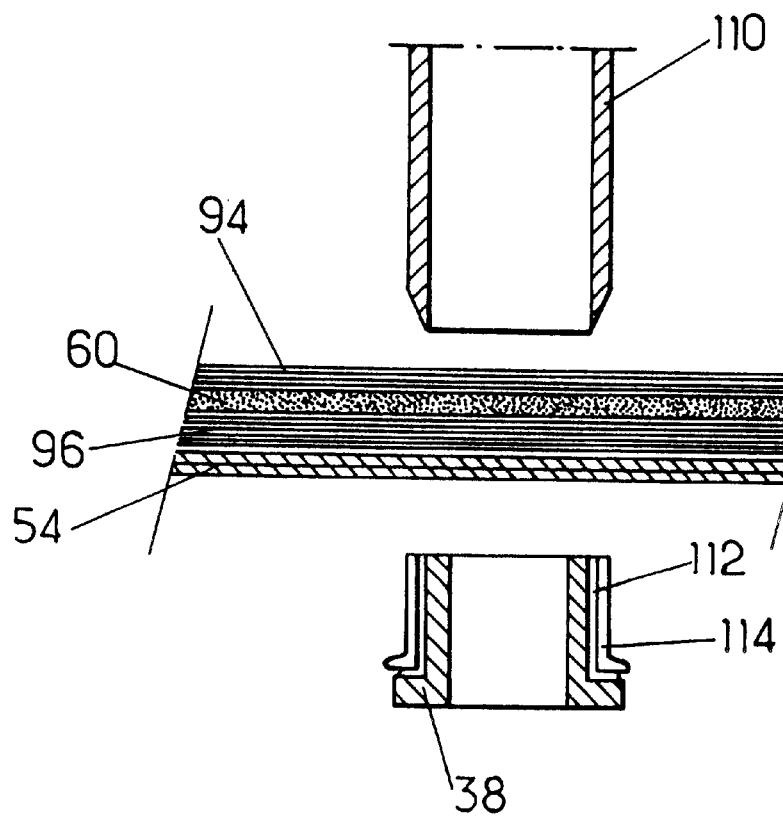
FIG. 12 is a diagram illustrating the placing of an attachment bushing on a blade according to the invention.

Before the shells are arranged in the final conforming mould, the openings 34 are pierced in the fastening regions 84 of the two shells. FIG. 12 illustrates this piercing step. The central part of FIG. 12 shows the pile of fabrics in the fastening region 84 of the lower shell before piercing (outer skin 54, spar 60, attachment reinforcements 94, 96). For piercing, use is made of a hollow punch 110 which cuts on its inside diameter, which inside diameter corresponds to the outside diameter of the bushing 38 which will be placed in the opening thus pierced. The tapered hollow punch allows the reinforcements to be pushed apart during cutting, leaving a visible opening of a diameter larger than that of the bushing. This makes it possible for the bushing 38 with its film of adhesive 112 and its electrical insulation tape 114 to be put in place easily.

The conforming mould has a lower half and an upper half, and its shape corresponds to the definitive shape of the blade. However, the inside of the conforming mould has, in the main blade section, a relief which corresponds to the housing for the sheath 68 of the leading edge. Furthermore, in line with the cylindrical portions 40, 42, the conforming mould has an internal diameter which is smaller than the inside diameter of the peripheral metal rings 76, 78. The components are put in place in the conforming mould, for example, in the following order:

the lower shell equipped with the lower side bushing 38, with its film of adhesive 112 and its insulating tape 114;

the inter-clevis filling fabrics 98;

the foam filler body 56 for the main blade section (in order to get the filler body 56 into shape beforehand, a block of foam may be machined roughly then the foam body may be heated, for example to 180° C., in tooling which reproduces the desired shape of the filler body 56; apart from giving the definitive shape, heating gives the foam a good surface finish which prevents the penetration of resin during injection; alternatively, the foam may be machined directly to the final shapes, which leads to savings in weight);

the end barrier (pile of fabrics rolled up and precompacted to suit the section of the filler body 56);

the upper shell equipped with the upper side bushing 36 with its film of adhesive and its electrical insulation tape;

the pile of fabrics which are intended to form the pitch-control lever 44, introduced by means of access slides provided in the blade root region of the conforming mould;

the linking fabrics 106 intended especially to cover the joint between the lower shell and the upper shell and which are introduced by access slides provided in the blade root region of the conforming mould.

An insert is placed in the cavity 32 of the blade root. This insert has a shape which corresponds to the final shape of the cavity 32, with a cylindrical opening aligned with the bushings 36, 38. A positioning device, consisting of another pin-shaped insert is installed so that it occupies the cylindrical space delimited by the bushings 36, 38 and the opening in the first insert. The conforming mould is then closed and heated to obtain a preform under the combined effect of the temperature and the closure pressure. The conforming mould is heated, for example, to a temperature of 100 to 110° C. The preform thus obtained has a certain amount of mechanical strength given that it is produced from dusted fabrics. This preform may be taken out of the conforming mould, equipped with the rings 76 and 78 and with the sheath 68 as explained hereinbelow and transported to an injection mould, or alternatively be stored, waiting to be taken to the injection mould.

The rings 76, 78 for guiding in terms of incidence are put in place around the preform before this preform is arranged in the injection mould. Since the preform, in the region of each cylindrical portion 40, 42 has a cylindrical portion of diameter smaller than the inside diameter of the corresponding ring 76, 78, this ring can be engaged without difficulty with interposition of a film of adhesive and of a glass fibre tape for electrical insulation. The sheath 68 of the leading edge is also put in place on the preform before the latter is put in the injection mould.

The preform thus equipped is placed in the injection mould. Before this mould is closed, an insert is put in place in the cavity 32, as is a positioning device allowing the bushings 36, 38 to be held in place during the injection phase, unless the insert and the positioning device used during conforming were left in place on the preform.

To proceed with injection, the injection mould is arranged vertically, so that the blade root section 22 is situated higher up than the main blade section 20. The liquid resin is injected into the lower part of the mould, and a partial vacuum is created at the upper part of the mould to cause the resin to rise and to limit the formation of porosities in the composite. The injection pressure at the base of the mould may be low (for example 0.5 bar gauge) so as to crush as little as possible the low-density foam of the filler bodies 56, 104 when such filler bodies are present. The partial vacuum created at the upper part of the mould corresponds for example to a vacuum of the order of $2 \times 10^{-4}$ bar. During injection, the mould is, for example, raised to a temperature of 130° C., and the liquid resin injected at a temperature of 90° C. After a few minutes, the liquid resin begins to emerge spasmodically from the point to which the partial vacuum is applied. The flow of resin coming out stabilizes progressively. When there are no longer any bubbles in this flow of resin, the partial vacuum orifice is sealed, maintaining pressure at the base of the mould, and the mould is heated up to the threshold for crosslinking the resin (typically 180° C.). The cooking time is, for example, two hours, after which the mould may be left to cool naturally.

The fact that the blade incorporates almost all its components as soon as it comes out of the injection mould is particularly advantageous. It especially allows the cost of manufacturing the blade to be limited, given that there is no longer any need to add elements to the blade afterwards when it has left the mould. Furthermore, excellent precision and excellent reproducibility in terms of the dimensioning of the composite material and the positioning of the metal inserts are obtained.

Just a small number of operations remain to be carried out on the blade once it has been taken out of the injection mould after cooling. The remaining operations are essentially:

cutting to length, consisting in forming the end of the main blade section to specification, by cutting off the end barrier, and possibly cutting to width by grinding the trailing edge 30;

piercing a drain opening 118 between the bottom of the cavity 32 and the base of the main blade section 20 in order to allow any water which enters the cavity 32 to be discharged (see FIG. 7);

piercing the bore 46 in the pitch-control lever 44, and putting the pin 48 in place (FIG. 1);

finishing paintwork;

static balancing.

It will also be noted that the sheath 68 of the leading edge could, in some cases, just as easily be positioned and bonded after the injection phase rather than before as described hereinabove.

The surface treatment of the metal elements, especially the rings 76, 78 for guiding in terms of incidence may have been performed beforehand, the external surface of these metal elements thus being protected during injection by an adhesive film (made of Teflon for example).

The blade can be balanced in a convenient way by fastening one or more balancing bodies 120 against a flank of a widened portion of the blade root section 22, and by removing material from this balancing body 120 in order to obtain the desired adjustment. FIGS. 1, 2, 3 and 5 thus show balancing bodies 120 fastened against the interior flank of the widest cylindrical portion 42 for guidance in terms of incidence. The balancing bodies 120 may be simply screwed into the composite material, the accuracy of their positioning not being critical.

What is claimed is:

1. Method for manufacturing a variable-pitch composite blade for a helicopter rotor, comprising the steps of:

producing a preform of the blade comprising a blade root section for connection to a hub and an aerodynamically profiled main blade section, wherein the blade root consists essentially of fibers, the blade root section of the preform including at least two cylindrical portions for guidance in terms of incidence, the said two cylindrical portions being spaced apart from each other;

arranging, as distinct pieces, at least two metal rings around the cylindrical portions for guidance in terms of incidence of the preform, respectively;

arranging the preform provided with each peripheral metal ring in an injection mould;

injecting a thermosetting liquid resin into the mould; and heating the mould to make the thermosetting resin set.

2. Method according to claim 1, wherein, at said at least two cylindrical portions for guidance in terms of incidence, the preform has a cylindrical portion with a diameter smaller than an inside diameter of the corresponding ring, the method further comprising, before said preform is arranged in the injection mould, the step of placing a tape of glass fibres and a layer of adhesive between said at least two cylindrical portions of the preform and said corresponding ring.

3. Method according to claim 1, wherein, in the step of injecting the thermosetting resin, the resin is injected into a lower part of the mould, and a partial vacuum is created in an upper part of the mould in order to cause the resin to migrate in the direction of a span axis of the blade.

4. Method according to claim 1, wherein the main blade section of the preform includes a central filler body made of a lightweight material.

5. Method according to claim 4, wherein the lightweight material of the filler body is a foam with a density of below 100 kg/m$^3$.

6. Method according to claim 1, further comprising a step of balancing the blade, which consists in fixing at least one balancing body against a flank of a widened portion of the blade root section and in removing material from said balancing body in order to obtain a desired adjustment.

7. Method according to claim 1, wherein the blade root section has two coaxial cylindrical portions for guidance in terms of incidence and a fastening region situated, in a longitudinal direction, between the two cylindrical portions for guidance in terms of incidence.

8. Method according to claim 7, wherein the blade root section includes at least one filler body made of lightweight material at the cylindrical portion for guidance in terms of incidence which is situated between the fastening region and the main blade section.

9. Method according to claim 8, wherein the lightweight material of the filler body is a foam with a density of below 100 kg/m$^3$.

10. Method according to claim 1, wherein the preform includes, in the blade root section, a pile of fabrics transverse to a span axis of the blade projecting with respect to the blade root section so as to form, after injection, a composite pitch-control lever.

11. Method according to claim 10, wherein binding fabrics at least partially cover a surface of the blade root section.

12. Method according to claim 11, wherein said binding fabrics cover flanks and a periphery of the pitch-control lever.

13. Method according to claim 1, wherein the preform includes at least one spar consisting of a web of fibres which is composed mainly of longitudinal structural carbon fibres, and of a substantially smaller proportion of glass fibres woven transversely between said carbon fibres.

* * * * *